United States Patent
Kirby et al.

[11] Patent Number: 5,196,228
[45] Date of Patent: Mar. 23, 1993

[54] LASER RESISTANT ELASTOMER COMPOSITION AND USE IN COATING PROCESS

[75] Inventors: John S. Kirby, Laguna Beach; Robert F. Reizer, Stanton, both of Calif.

[73] Assignee: McDonnell Douglas Corporation, Long Beach, Calif.

[21] Appl. No.: 581,186

[22] Filed: Feb. 17, 1984

[51] Int. Cl.$^5$ .................... B05D 3/06; B05D 3/02; C08L 83/06

[52] U.S. Cl. .................... 427/515; 428/447; 428/920; 523/137; 523/179; 427/226

[58] Field of Search .................... 343/18 B, 18 E; 427/53.1, 226; 428/447, 920; 523/135, 137, 179

[56] References Cited

U.S. PATENT DOCUMENTS

| | | | |
|---|---|---|---|
| 3,202,535 | 8/1965 | Gaynes | 428/447 X |
| 4,031,059 | 6/1977 | Strauss | 428/447 X |
| 4,183,998 | 1/1980 | Vassiliou | 428/447 X |
| 4,431,697 | 2/1984 | Rolinski et al. | 428/920 X |

FOREIGN PATENT DOCUMENTS 3018548 11/1981 Fed. Rep. of Germany ...... 523/137

Primary Examiner—Richard D. Lovering
Attorney, Agent, or Firm—George W. Finch; John P. Scholl

[57] ABSTRACT

An elastomeric composition having high resistance to laser radiation and to thermal radiation, which consists essentially of a phenylpolysiloxane and an additive selected from the group consisting of titanium dioxide, boron nitride, and mixtures thereof, particularly titanium dioxide, in a proportion of about 10 to about 30 pats of the additive per 100 parts of the polysiloxane. When such elastomer composition is coated on an aerospace vehicle such as a missle, the composition then cured and subjected to high intensity laser radiation or thermal radiation, the composition forms a substantially white char which is effectively reflective to such radiation, thereby protecting such vehicle from the adverse effects of such radiation.

15 Claims, No Drawings

LASER RESISTANT ELASTOMER COMPOSITION AND USE IN COATING PROCESS

BACKGROUND OF THE INVENTION

This invention relates to elastomer compositions, and is particularly directed to siloxane elastomer compositions capable of forming coatings which are resistant to laser radiation, and to a process for protecting the surfaces of objects, especially aerospace vehicles, from laser radiation and thermal radiation.

Ablative coatings are known for use in various portions of aerospace vehicles to protect the outer skin of an aerospace body such as a missile from the eroding effect of the high temperatures which occur when the vehicle or body passes at high speed through the atmosphere. An ablative coating for this purpose is disclosed in U.S. Pat. No. 3,268,359, prepared from a composition consisting essentially of certain siloxane elastomers. Such siloxanes are disclosed as generally containing fillers which aid in stabilizing the composition. Fillers which are disclosed in the patent include inorganic materials such as fume silica, silica aerogel, diatomaceous earth, quartz, sand, silicates such as aluminum silicate, clay and zirconium silicate and metal oxides such as titanium dioxide and ferric oxide. These are stated to be conventional inorganic fillers normally used in organo-siloxane elastomers.

Recently, high energy infrared lasers have been developed for many applications including the use of high power lasers in laboratories as investigating tools and in research. Devices employing powerful lasers have been developed for communication, range finding and other military purposes. The energy transmitted by these lasers can be very dangerous both to personnel and to sensitive devices such as aerospace vehicles.

Interposing a filter which absorbs or diverts the laser beam has been found to be insufficient in that the filter material is often immediately melted and/or vaporized by the high localized energy application. Even highly efficient reflectors may be destroyed when surface dirt or dust absorbs sufficient energy to cause localized overheating and destruction of the reflector.

U.S. Pat. No. 3,982,206 discloses a system for protection from laser radiation in the form of a protective cover window which comprises a plate which is substantially transparent to infrared radiation, and a vaporizable coating on the plate which comprises a fluorinated ethylene-propylene polymer which rapidly vaporizes without leaving a residue when subjected to intense infrared radiation. Other materials which can be employed include epoxy, silicone and polysulfide resins, the fluorinated ethylenepropylene resins being preferred.

Elastomer materials such as silicone or siloxane elastomers have the advantage of having relatively low thermal conductivities, but have the disadvantage in that they have relatively low ablation energies. Thus, elastomers such as siloxanes are known to have poor laser radiation resistance because of their low ablation energies. Accordingly, an investigation was made for materials which would provide increased laser performance, that is increased resistance from laser radiation, while offering the above noted advantages of the elastomer. In this investigation, it was sought to obtain a composition of a silicone resin and an additive material which when combined is effectively reflective to the incident radiation, so that when the composition or cured coating formed therefrom chars, it does not char black, i.e., becomes absorptive to the radiation, but chars white, i.e., the charred coating retains its reflectivity during the ablation process. At the same time it was necessary that the additive be a high melting material of suitable optical characteristics, and which is not hydrolyzable or have other deleterious physical or chemical properties.

Accordingly one object of the invention is the provision of an elastomer material and an inorganic additive which, when combined, are capable of forming a coating having improved resistance to laser radiation, and to a process for protecting the surfaces of an object from laser radiation and thermal radiation.

Another object is the provision of an elastomer coating of the type noted above comprising a siloxane elastomer and an additive which is effectively reflective to incident laser radiation so that when a coating formed from the composition chars by impingement of laser radiation, the coating chars white, i.e., the coating retains its reflectivity during the ablation process.

A still further object is to provide an elastomer composition of the above type including as essential elastomer component, a siloxane resin and an inorganic additive in an amount capable of forming a cured coating having enhanced resistance to laser radiation and also resistance to thermal radiation sources.

A still further object is the provision of laser resistant compositions of the above type formed essentially of only two components and which is readily formulated and applied as a coating on a substrate, such as the skin of an aerospace body or missile.

SUMMARY OF THE INVENTION

The above objects and advantages are achieved and a composition having high resistance to laser radiation is provided according to the invention by the provision of a composition consisting essentially of a polysiloxane, particularly a phenylsiloxane polymer and an additive in the form of titanium dioxide ($TiO_2$) or boron nitride (BN) in certain proportions, as defined hereinafter. Mixtures of titanium dioxide and boron nitride can also be employed.

The invention is based upon the observation that most elastomers are transparent to most radiation wavelengths, i.e., the radiation essentially passes completely through the elastomer material. Single crystals of $TiO_2$ and BN are also transparent to this radiation. But, the index of refraction, i.e., the angle by which photons are bent when they enter the material at an angle, is different for the elastomer and the additive. Because of the mismatch of indices of refraction the elastomer appears to be white when the $TiO_2$ and BN powders are added to the elastomer. The cause of this apparent whiteness is a process called backscattering, which occurs when a light ray traverses the $TiO_2$ or BN loaded elastomer. When the light ray enters the elastomer, its direction is bent slightly due to the index of refraction of the material. As the ray then hits an additive particle, its direction is changed again. Because of the many additive particles in the elastomer, the direction of the light ray becomes random and it is highly likely that the ray will eventually exit the front of the elastomer material. This process leads to the effective reflectivity of the material.

Since the process is random, the amount of effective reflectivity is related to the thickness of the material. There is a greater chance for the light ray to simply pass through thin pieces of material than for thick pieces. And, indeed when total reflectivity measurements are made on elastomer materials, the reflectivity is found to be directly proportional to the thickness of the sample tested.

Because the effective reflection process works in depth, it is necessary that the elastomeric material be of a type such that the light ray can penetrate the surface of the material. Such a penetration would not be possible if the surface of the material charred black, i.e., became totally absorptive at the surface. Such a result would occur if an organic elastomer such as an acrylic elastomer were used as the matrix material, i.e., the material in which the additive were placed. But, by using a siloxane elastomer as the matrix, the material does not form an absorptive layer at the surface when it chars. This satisfies the objective of having a material that utilizes both ablation and reflection as energy rejection mechanisms.

Both titanium dioxide and boron nitride are essentially white in color and are reflective to incident laser radiation and to radiation from a thermal radiation source. When a coating of the elastomer composition of the invention containing the above additive chars, it chars white. Thus, the coating formed from the invention composition retains its effective reflectivity during the ablation process. However, although silicone elastomers per se contain a relatively smaller amount of carbonaceous char forming organic material than other organic polymers, the amount of carbon present in such elastomers still blackens the material during charring, and substantially reducing its reflectivity and its resistance to laser radiation and thermal radiation.

On the other hand, because the coating formed of the invention composition retains its effective reflectivity during the ablation process, it has significantly better performance in the laser and thermal radiation environments, that is it has increased resistance to laser and thermal radiation, than an organic siloxane elastomer per se. Testing of laser radiation resistance of the invention composition containing the above additive, has shown that the white charring siloxane elastomer composition of the invention provides substantially greater protection from laser radiation compared to other elastomers presently employed in ablation coatings, such as the acrylic elastomer marketed as Vamac by DuPont.

While the siloxane elastomer materials possess the disadvantage that they have relatively low ablation energies, they have the advantage of having relatively low thermal conductivities. On the other hand, coatings formed from the composition of the invention containing the siloxane elastomer and the above additive, particularly titanium dioxide, improves the ablation performance of the elastomer while retaining the advantage of the low thermal conductivity of such elastomer.

In particular, coatings formed from the siloxane elastomer composition of the invention have been found to have high resistance to radiation heating environment, including high laser radiation resistance, and high thermal radiation resistance from any source, including solar radiation. The invention composition has the additional advantages of being readily formulated from a mixture of only two essential components and can be formed from relatively low cost additive material, particularly titanium dioxide.

Broadly then, the invention is directed to an elastomeric composition having high resistance to laser radiation and thermal radiation, said composition forming a substantially white char when subjected to high intensity laser radiation or thermal radiation, which consists essentially of a polysiloxane and an additive selected from the group consisting of titanium dioxide, boron nitride, and mixtures thereof, in a proportion of about 15 to about 30 parts of said additive per 100 parts of said polysiloxane.

The invention is also directed to a process for protecting the surfaces of an object from laser radiation and thermal radiation, which comprises applying to said object a composition which consists essentially of a polysiloxane and an additive selected from the group consisting of titanium dioxide, boron nitride, and mixtures thereof, in a proportion of about 10 to about 30 parts of said additive per 100 parts of said polysiloxane, curing said composition and subjecting said cured composition to high intensity laser radiation or thermal radiation, and converting said cured composition to a substantially white char which is effectively reflective to laser radiation and to thermal radiation.

DETAILED DESCRIPTION OF THE INVENTION AND PREFERRED EMBODIMENTS

The elastomer component of the invention composition is a phenylpolysiloxane elastomer containing phenylmethylsiloxane units, diphenylsiloxane units, or a mixture thereof. The elastomer can also contain some dimethylsiloxane units Thus, the polysiloxanes employed in the present invention are preferably a homopolymer of phenylmethylsiloxane, a homopolymer of diphenylpolysiloxane or a copolymer of phenylmethylsiloxane and diphenylsiloxane. The siloxane elastomer also can be a copolymer of dimethylsiloxane and diphenylsiloxane, a copolymer of dimethylsiloxane and phenylmethylsiloxane, or a copolymer of dimethylsiloxane, phenylmethylsiloxane and diphenylsiloxane.

The second essential component of the invention composition is the additive titanium dioxide, boron nitride, or mixtures thereof These materials are effectively reflective to the incident radiant energy from laser radiation, or other thermal radiation sources such as solar radiation, when combined with the elastomer as described above. These additive materials have a high melting point, are non-hygroscopic and are otherwise not deleterious to the elastomer either in its initial form, or during curing of the composition, or when a coating of the composition is subjected to laser radiation generating high temperatures of say between 5,000° F. and 6000° F. When a coating formed of the invention composition containing such additives chars, the additive aids in conjunction with the polysiloxane elastomer of relatively low carbon content, to produce a white char, thus retaining the effective reflectivity of the composition under these conditions.

During the development of the present invention, compositions containing a phenylpolysiloxane elastomer and various additives were investigated, for resistance to laser and thermal radiation. Thus, for example calcium carbonate was used as an additive but was found unsatisfactory because of its hygroscopic characteristics. Other materials or fillers such as $Al_2O_3$, MgO and ZnO were also incorporated into the elastomer composition but were found to provide inferior laser radiation resistance and thermal resistance due to various factors such as, for example, not providing a suitably white char when subjected to high temperature flame conditions. Only the titanium dioxide and boron nitride additives were found to be highly effective in the phenylpolysiloxane elastomer compositions to provide the high laser radiation and thermal resistance desired.

It has been found that the titanium dioxide or boron nitride additive should be employed in a range of about 10 to about 30 parts, per 100 parts of the silicone elastomer, to obtain effective results. If less than about 10 parts of the titanium dioxide or boron nitride additive is employed, per 100 parts of the silicone elastomer, too much carbon is present in the char formed from the coating, so that the coating is grayish in color and has insufficient laser radiation resistance. If too high an amount of additive is employed, although the char formed from the invention coating is white and the material retains its highly effective reflectivity, the composition becomes unduly stiff and difficult to calender, i.e., process, the material heats up during the mixing cycle, and becomes difficult to apply, and the Shore hardness of the resulting coating increases.

The invention composition is prepared by mixing and blending the components on a mill to provide a uniform mass. The composition can be applied to the skin of an aerospace vehicle such as a missile, using any convenient method and thereafter cured by heating or at room temperature, depending upon the curing catalyst employed. The thickness of the coating can be varied as desired to retain the effective reflectivity of the composition during charring, as described above. The thickness of the coating can range, for example from about 0.100 to about 0.500 inch. Alternatively, the elastomer composition of the invention can be molded and cured by compression molding, transfer molding or injection molding, into any desired configuration, whether flat or planar, or any other irregular shape.

The siloxane elastomer of the invention composition is cured by use of conventional peroxide curing agents such as benzoyl peroxide, t-butyl perbenzoate, ditertiary butyl peroxide, dichlorobenzoyl peroxide or dicumyl peroxide, or the composition can be of the room temperature curing type, e.g., those cured by incorporating alkylsilicates and suitable catalysts.

Examples of effective compositions according to the invention are those shown in the table below:

| Components | Compositions (parts by wt.) | | | | | | |
| --- | --- | --- | --- | --- | --- | --- | --- |
| | A | B | C | D | E | F | G |
| Diphenylpoly-siloxane | 100 | 100 | 100 | — | — | 100 | 100 |
| Phenylmethyl-polysiloxane | — | — | — | 100 | 100 | — | — |
| $TiO_2$ | 21.25 | 17 | 25 | 21 | 25 | — | — |
| Boron nitride | — | — | — | — | — | 21 | 25 |

Composition A above is an optimum composition according to the invention.

Composition A above is an optimum composition according to the invention.

The following are examples of practice of the present invention, such examples only being illustrative and are not to be construed as limitative of the invention.

EXAMPLE I

Composition A was prepared by mixing and milling together diphenylpolysiloxane, marketed as Rhodorsil by Rhone & Poulenc, and titanium dioxide, to form a homogeneous mixture.

The resulting composition was cured at 300°–500° F. for 1 hour and post cured at 400°–500° F. for 16–20 hours, into the form of a blank which had the following properties.

| Properties | |
| --- | --- |
| Specific gravity (g/cm$^3$) | 1.33 |
| Elongation (%) | 355 |
| Tensile strength (psi) | 915 |
| Modulus @ 100% (psi) | 190 |
| Modulus @ 300% (psi) | 785 |
| Shrinkage (%) | 3.0 |
| Tear Strength (ppi)-Die B | 110 |
| Tear Strength (ppi)-Die C | 90 |
| Shore hardness - A points | 58 |

The resulting cured sample was tested for resistance to laser radiation as described in Example II below.

EXAMPLE II

The laser radiation resistance of Composition A above was tested against a conventional ablation material marketed by DuPont as Vamac, an ethylene-acrylic elastomer, and formulated into a composition designated Vamac 22B by adding carbon black filler and conventional diphenylguanidine accelerator and amine curing agent. Sample specimens or blanks of each of the above compositions were formed by curing the respective compositions.

The resulting cured specimens were tested for resistance to laser radiation in a conventional test facility for this purpose, known as the Air Force Laser Hardening Material Evaluation Laboratory LHMEL, in which the previously weighed samples were exposed to a laser beam or spot of a specified size generating temperatures of 5000°–6000° F., for a specified time period, and the resulting ablated samples were reweighed.

The Q* value thus obtained for each of the specimens, is the heat of ablation generated by laser exposure, and represents the amount of energy required to ablate a unit mass, e.g., one gram, of the ablation material, the higher the Q* value, the greater the laser radiation resistance of the material.

In these tests two cured specimens of composition A of the invention had effective Q* values of 20.7 and 23.7 kJ/gm (kilojoules per gram), respectively, while two cured specimens of Vamac 22B had Q* values of 4.1 and 4.8, respectively. These results indicate that the silicone elastomer composition A of the invention is approximately four times as effective against laser radiation resistance as the conventionally employed Vamac elastomer.

EXAMPLE III

Composition B of the above table is prepared in a manner similar to that described in Example I, and the resulting composition is formed into a cured sample and tested by substantially the same procedure noted in Example II above.

The results obtained are similar to the results noted in Example II above employing composition A of the invention.

EXAMPLE IV

Composition F of the above table is prepared in a manner similar to that described in Example I, and the resulting composition is formed into a cured sample and tested by substantially the same procedure noted in Example II above.

The results obtained are similar to the results noted in Example II above employing composition A of the invention From the foregoing, it is seen that the invention provides a novel elastomer composition containing as essential components a phenylpolysiloxene, as described above, and as an additive, titanium dioxide or boron nitride, in certain specified proportions, which when cured have markedly enhanced resistance to laser radiation, as well as resistance to thermal radiation from other sources including solar radiation. The composition is readily formulated from only two components, and can be readily formed into coatings or molded parts. The elastomer composition of the invention substantially improves the ablation performance and laser radiation resistance of the base siloxane elastomer, while retaining the advantage of the low thermal conductivities of such elastomer. Thus the use of the invention composition provides enhanced protection from the adverse effects of laser radiation and of radiation from other high temperature thermal radiation sources, superior to other conventional ablation compositions such as Vamac and silicone elastomers per se. The invention also includes the method for increasing resistance to laser radiation and to thermal radiation.

Since various changes and further modifications of the invention will occur to and can be made readily by those skilled in the art without departing from the invention concept, the invention is not to be taken as limited except by the scope of the appended claims.

What is claimed is:

1. An elastomeric composition having high resistance to laser radiation and thermal radiation, said composition forming a substantially white char when subjected to high intensity laser radiation or thermal radiation, which consists essentially of a phenylpolysiloxane and titanium dioxide as additive in an amount of about 21 parts to 100 parts of said phenylpolysiloxane, and substantially free of calcium carbonate or alumina.

2. The composition of claim 1, wherein said polysiloxane is diphenylpolysiloxane.

3. A process for protecting the surfaces of an object from laser radiation and thermal radiation, which comprises applying to said object a composition which consists essentially of a polysiloxane and an additive selected from the group consisting of titanium dioxide, boron nitride, and mixtures thereof, in a proportion of about 10 to about 30 parts of said additive per 100 parts of said polysiloxane, curing said composition and subjecting said cured composition to high intensity laser radiation or thermal radiation, and converting said cured composition to a substantially white char which is effectively reflective to laser radiation and to thermal radiation.

4. The process of claim 3, wherein said composition is applied as a coating to an aerospace vehicle.

5. The process of claim 3, employing about 21 parts of said additive per 100 parts of said polysiloxane.

6. The process of claim 3, wherein said polysiloxane is a phenylpolysiloxane.

7. The process of claim 3, wherein said polysiloxane is selected from the group consisting of a homopolymer of phenylmethylsiloxane, a homopolymer of diphenylsiloxane and a copolymer of phenylmethylsiloxane and diphenylsiloxane.

8. The process of claim 7, employing about 21 parts of said additive per 100 parts of said polysiloxane.

9. The process of claim 3, wherein said polysiloxane is selected from the group consisting of a copolymer of dimethylsiloxane and phenylmethylsiloxane, a copolymer of dimethylsiloxane and diphenylsiloxane, and a copolymer of dimethylsiloxane, phenylmethylsiloxane and diphenylsiloxane.

10. The process of claim 3, wherein said additive is titanium dioxide.

11. The process of claim 3, wherein said additive is boron nitride.

12. The process of claim 3 for protecting the skin of a missile from laser radiation, said polysiloxane being a phenylpolysiloxane and said additive being titanium dioxide.

13. The process of claim 12 wherein said polysiloxane is selected from the group consisting of a homopolymer of phenylmethylsiloxane, a homopolymer of diphenylsiloxane, and a copolymer of phenylmethylsiloxane and diphenylsiloxane.

14. The process of claim 3, wherein said composition is applied as a coating to the skin of a missile, said polysiloxane being a phenylpolysiloxane, and said additive being titanium dioxide, employed in an amount of about 21 parts of said titanium dioxide to 100 parts of said phenylpolysiloxane.

15. The process of claim 14, wherein said polysiloxane is diphenylpolysiloxane.

* * * * *